(12) United States Patent
Akutagawa

(10) Patent No.: US 6,660,317 B1
(45) Date of Patent: Dec. 9, 2003

(54) METHOD OF PRODUCING PATTERNED COMPOUND FOOD AND PRODUCTION SYSTEM USED FOR THE METHOD

(75) Inventor: Tokuji Akutagawa, Tokyo (JP)

(73) Assignee: Akutagawa Confectionery Co., Ltd., Tokyo (JP)

( * ) Notice: Subject to any disclaimer, the term of this patent is extended or adjusted under 35 U.S.C. 154(b) by 0 days.

(21) Appl. No.: 09/762,415

(22) PCT Filed: Aug. 9, 1999

(86) PCT No.: PCT/JP99/04288

§ 371 (c)(1),
(2), (4) Date: Feb. 7, 2001

(87) PCT Pub. No.: WO00/07455

PCT Pub. Date: Feb. 17, 2000

(30) Foreign Application Priority Data

Aug. 7, 1998 (JP) ......................................... H10-244082

(51) Int. Cl.[7] ........................... B29C 42/26; A23G 1/00; A23G 1/20; A23G 3/28
(52) U.S. Cl. ...................... 426/249; 426/660; 426/512; 426/516; 425/130; 425/376.1; 425/447
(58) Field of Search ................................. 426/249, 660, 426/512, 516; 425/130, 376.1, 447

(56) References Cited

U.S. PATENT DOCUMENTS

| | | | | |
|---|---|---|---|---|
| 4,501,544 A | * | 2/1985 | Akutagawa | 425/218 |
| 5,443,856 A | * | 8/1995 | Akutagawa et al. | 426/515 |
| 6,039,554 A | * | 3/2000 | Akutagawa | 425/130 |
| 6,200,125 B1 | * | 3/2001 | Akutagawa | 425/462 |
| 6,283,742 B1 | * | 9/2001 | Akutagawa | 425/130 |
| 6,361,811 B2 | * | 3/2002 | Akutagawa | 426/249 |
| 6,383,539 B1 | * | 5/2002 | Akutagawa | 426/249 |

FOREIGN PATENT DOCUMENTS

| | | |
|---|---|---|
| EP | 783 840 | 7/1997 |
| JP | 61/173744 | 8/1986 |
| JP | 06/031250 | 2/1994 |
| JP | 07/236409 | 9/1995 |
| JP | 9/224575 | 9/1997 |
| JP | 10-117689 | 5/1998 |

OTHER PUBLICATIONS

Patent Abs.JP—09–224575.
Patent Abs.JP—10–117689.
Patent Abs. –61173744.
Patent Abs.JP 07–236409.
Patent Abs.JP 06–031250.

* cited by examiner

Primary Examiner—Nina Bhat
(74) Attorney, Agent, or Firm—Keil & Weinkauf

(57) ABSTRACT

Disclosed is a method for producing patterned compound food products that realizes production, by simple control, of food products having a surface color pattern, enclosing a food material of a taste different from that of the food material forming the outer section, and having excellent appearance without seams on the surface. The method includes: (A) pouring predetermined amounts of at least two kinds of fluid food materials of different colors for forming the outer section into a cavity of a mold to obtain a preshaped product in a substantially fluid state held in the cavity shape; (B) inserting a nozzle into the preshaped product; (C) injecting a predetermined amount of fluid filling material for forming the inner section through the nozzle into the preshaped product; (D) drawing the nozzle out of the preshaped product; and (E) solidifying, after (D), at least the fluid food materials in the cavity.

7 Claims, 8 Drawing Sheets

US 6,660,317 B1

METHOD OF PRODUCING PATTERNED COMPOUND FOOD AND PRODUCTION SYSTEM USED FOR THE METHOD

This application claims benefit under 35 U.S.C. 371 of PCT/JP99/04288 filed Aug. 9, 1999.

FIELD OF INVENTION

The present invention relates to a method of producing compound food products having a surface color pattern and enclosing a food injected inside that is different from the outer part of the product at least in taste, and to a production system used for the method.

BACKGROUND ART

Compound food products that provide a plurality of different tastes in one piece are known, such as a chocolate product having an outer chocolate coating and an inner fluid filling material such as liqueur, jam, or chocolate of a taste that is different from the taste of the outer chocolate coating.

Such chocolate products with a filling are produced by known methods such as those shown in FIG. 9 or 10.

In the method shown in FIG. 9, two pre-solidified chocolate members (22, 22') each having a cavity are arranged with the cavities facing each other, and bonded together by heating to first prepare a bottle-shaped chocolate product having a mouth 23 (see FIG. 9(a)). Then the cavity is filled with or charged with a liqueur or brandy injected through a nozzle 28 of a filling machine or an injection machine 27 (see FIG. 9(b)). Finally, the mouth 23 is closed with chocolate (see FIG. 9(c)).

In this method, pre-solidified chocolate members (22, 22') are bonded together, so that a seam resulting from the bonding appears on the surface of the final product. Such a seam severely impairs the decorative value of products, in particular those having patterns on their surfaces and having importance attached to their decorativeness, such as products for Christmas or Valentine's Day.

In the method shown in FIG. 10, a mold with a cavity is charged with a molten chocolate material, shaken, and turned upside down to let the molten material that has not stuck on the cavity surface fall off and be collected. Then the mold is returned to the initial position, the chocolate material stuck on the mold cavity surface is cooled, and a separate fluid filling material as a filling is poured into the chocolate cavity up to the middle and cooled. The molten chocolate material is poured again and scraped off, and the entire body is cooled and solidified to produce a chocolate product with a filling, which is then demolded.

This method includes the step of collecting a portion of the molten chocolate material, which makes the process complicated and onerous, and control of the process is also complicated. Further, since the collected molten material is usually re-used, management thereof also adds complexity.

In manufacture of products, in particular, having a certain color pattern using two or more kinds of molten chocolate materials of different colors, the two or more kinds of materials should be poured into the cavity without mixing with each other completely, in order to make the pattern of resulting products constant. In this method, however, the two or more kinds of molten materials of different colors are completely mixed upon collection, so that the collected materials cannot be re-used.

In order to solve these problems, a method for producing chocolate products with a filling having a color pattern at least on their surface, has been proposed, which does not cause decoration-spoiling seams on the surface, and which does not require collection of molten chocolate materials and its following re-use, as required in the method shown in FIG. 10.

According to this method, predetermined amounts of two or more kinds of molten chocolate materials of different colors are simultaneously poured into the cavity of a mold through nozzles so as not to be mixed up. A fluid filling material as a filling is then poured into the cavity in the middle, while the two or more kinds of molten chocolate materials of different colors in predetermined amounts are poured around the filling. Then only the two or more kinds of molten chocolate materials of different colors are poured again over the top.

In this method, the filling and the molten materials are simultaneously poured through separate nozzles onto the molten materials that has previously been poured into the cavity. As a result, these filling and materials are likely to mix with each other, so that enclosure of the filling in the product is difficult to control and defective products frequently result.

DISCLOSURE OF THE INVENTION

It is an object of the present invention to provide a method for producing patterned compound food products that realizes production, by simple control, of patterned compound food products having a surface color pattern, enclosing a food material of a taste different from that of the food material constituting the outer part, and having excellent appearance without seams on their surface; and a production system used for the method.

It is another object of the present invention to provide a method for producing patterned compound food products that can provide simple control over placement of a fluid filling material inside the products, and that can reduce the ratio of defective products; and a production system used for the method.

It is another object of the present invention to provide a method for producing patterned compound food products that can easily control the surface color patterns of the resulting food products to be substantially constant, and that can manufacture compound food products providing different tastes in one piece; and a production system used for the method.

According to the present invention, there is provided a method for producing patterned compound food products having an outer section with a pattern formed of at least two kinds of fluid food materials of different colors, and an inner section formed of a fluid filling material having a taste different from that of the outer section, said method comprising the steps of:

(A) pouring predetermined amounts of at least two kinds of fluid food materials of different colors for forming an outer section into a cavity of a mold to obtain a preshaped product in a substantially fluid state held in the shape of said cavity;

(B) inserting a nozzle into said preshaped product;

(C) injecting a predetermined amount of fluid filling material for forming an inner section through said nozzle into the preshaped product;

(D) drawing said nozzle out of said preshaped product; and (E) solidifying, after step (D), at least said fluid food materials in the cavity.

According to the present invention, there is also provided a production system used for the above method for producing patterned compound food products having an outer section with a pattern formed of at least two kinds of fluid food materials of different colors, and an inner section formed of a fluid filling material having a taste different from that of the outer section, said system comprising:

a charging device for pouring predetermined amounts of at least two kinds of fluid food materials of different colors into a cavity of a mold;

an injecting device having a vertically movable nozzle for injecting a predetermined amount of fluid filling material through said nozzle;

a solidifying device for solidifying at least said fluid food materials in the cavity; and a translating device for translating the mold from said charging device to said injecting device and then to said solidifying device.

PREFERRED EMBODIMENT OF THE INVENTION

Figure 1:
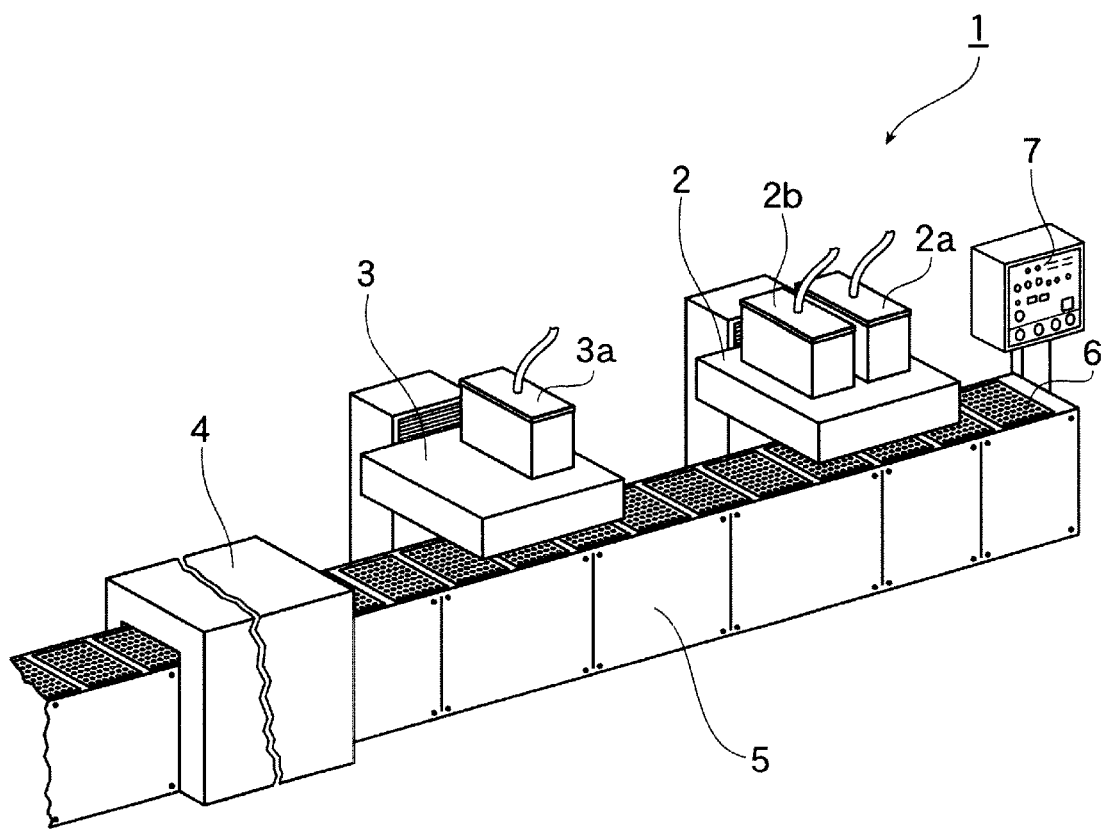
FIG. 1 is a schematic perspective view showing an embodiment of the production system according to the present invention.

The patterned compound food products obtained through the method of the present invention are composed of the inner and outer sections, with these two sections having different constitutional food material tastes, and with the latter having a color pattern. Different tastes can be enjoyed in one piece of the product, and the surface color pattern provides optimal products for Christmas or Valentine's Day where decorativeness is required.

According to the method of the present invention, step (A) is carried out first wherein predetermined amounts of at least two kinds of fluid food materials of different colors for forming the outer section are poured into a cavity of a mold to obtain a preshaped product in a substantially fluid state held in the shape of the cavity.

The fluid food materials used in step (A) may be any food materials as long as they have some viscosity, exhibit fluidity upon heating or the like treatment, and solidify upon cooling, heating or the like treatment. Examples of such food materials include chocolate materials; fish or meat paste materials such as materials for steamed fish paste; jelly materials; cheese; dough for pastry, cakes, cookies, or the like; sweet bean jelly; and ice creams. The viscosity of the fluid food materials upon pouring into the cavity may suitably be selected depending on the kind of the fluid food materials, the kind or specific gravity of a fluid filling material to be discussed later, or other factors. It is preferred that the at least two kinds of fluid food materials of different colors have nearly an equal viscosity in order to form a desired pattern.

In the present invention, the colors include black and white, and may be natural or artificial colors. As used herein, "different colors" include colors that are of the same hue but different only in the density.

The mold used in the present invention has one or more conventional cavities of a variety of shapes. The shape of the cavity is not particularly limited. The inner surface of the cavity may be flat, or the bottom of the cavity may be provided with a convex or concave portion such as of a star shape.

The at least two kinds of fluid food materials of different colors may be poured into a cavity of a mold by, when the cavity has a concave portion, first charging the concave portion with a certain kind of fluid food material, and then pouring the at least two kinds of fluid food materials of different colors. The predetermined amounts of the two kinds of fluid food materials of different colors to be poured in step (A) should be decided so that, when the fluid filling material to be discussed later is injected, the cavity is filled with the fluid food materials and the fluid filling material, or the cavity has a little room left. The predetermined amounts may suitably be decided depending on the kind of a food product to be obtained, the ratio of the inner and outer sections constituting a food product, or the like factors.

The at least two kinds of fluid food materials to be poured into the cavity may be mixed to some extent upon pouring, as long as complete mixing of the fluid food materials, which will cause no color pattern formation on the resulting product surface, is avoided. In this case, however, since control of the color pattern formation is difficult, it is usually impossible to manufacture products having the same color pattern.

In order to give a substantially identical color pattern to the resulting products to further improve the commercial value of the products, a nozzle assembly mounted on the charging device (A) to be discussed later, for example, may be used to branch each fluid food material separately in a nozzle and nearly simultaneously and continuously pouring all the materials into the cavity.

More specifically, for example, a predetermined amount of each fluid food material may be measured out with a depositor equipped with a measurer, and simultaneously but separately supplied to each region located above the nozzle assembly and communicating with one of at least two discrete passages in the nozzle assembly. Each fluid food material supplied to the nozzle assembly may then be branched while it advances substantially horizontally in the nozzle assembly, and discharged separately but substantially simultaneously from the lower portion of the nozzle assembly into the cavity, to thereby fill the cavity with predetermined amounts of fluid food materials.

When such a nozzle assembly is used, the fluid food materials are supplied into the upper portion of the nozzle assembly, branched while they horizontally advance in the nozzle assembly without being merged, discharged from the lower portion of the nozzle assembly, and merged in the cavity. Thus, a variety of patterns may be designed on the resulting food products by suitably selecting the number and arrangement of streams of the fluid food materials in the nozzle assembly. As used herein, "to merge" does not mean that fluid food material streams of different colors are mixed up to present a different color, but mean that the streams of different colors contact with each other yet substantially maintain their own colors.

Instead of merging the fluid food materials in the cavity, the fluid food materials may be branched in the nozzle assembly, then merged just before entering the cavity, and discharged from the lower portion of the nozzle assembly. By merging the fluid food materials just before entering the cavity, more complex patterns, such as a corrugated pattern, may be produced, or the boundaries between different colors of merged fluid food materials may be gradated. Gradation is formed only around the boundaries, and the resulting food products have a pattern with two or more different colors.

As discussed above, by pouring predetermined amounts of at least two kinds of fluid food materials of different colors into the cavity, a preshaped product in a substantially fluid state held in the shape of the cavity is obtained. The "substantially fluid state" of the preshaped product may be the same state of fluidity as that of the fluid food materials when they are poured, or the preshaped product may be partially solidified near the bottom and/or walls of the cavity. That is, it suffices that at least a part of the upper surface of the preshaped product and most of the inside of the preshaped product, into which a fluid filling material to be discussed is to be injected, are in a fluid state. Such conditions may be achieved by controlling the temperature of the cavity walls or the environment, or the like factors, depending on the kinds of the fluid food materials.

According to the method of the present invention, next, a nozzle is inserted into the preshaped product in step (B), a predetermined amount of fluid filling material for forming the inner section is injected through the nozzle into the preshaped product in step (C), and the nozzle is drawn out of the preshaped product in step (D).

The fluid filling material may be, for example, a chocolate material of a taste that is different from those of the chocolate materials as the fluid food materials; cream such as ganache or gianduja; jam such as strawberry jam or marmalade, or bean paste. The fluid filling material may contain solids such as crushed nuts as long as the material has fluidity and can be discharged through a nozzle.

The fluid filling material, when injected into the preshaped product of a substantially fluid state, should not sediment on the bottom of the cavity. The fluid filling material should also stay in the middle of the fluid food materials. In order to prevent such sedimentation, or to make the fluid filling material stay in the fluid food materials, it is preferred, for example, to select, as a fluid filling material, a material having a higher viscosity than, or almost the same specific gravity as the fluid food materials. Alternatively, by solidifying or increasing the viscosity of the bottom of the preshaped product to some extent, the sedimentation may be prevented regardless of the kind of the fluid filling material.

Steps (B) to (D) facilitate control of the fluid filling material for forming the inner section to place the material inside the preshaped product. In other words, the fluid filling material may be placed inside the preshaped product by adjusting the diameter of the nozzle to be inserted and the amount and pressure of the fluid filling material to be injected, depending on the kind of the fluid food materials forming the preshaped product and the kind of the fluid filling material. As the nozzle is inserted into the fluid state portion of the preshaped product and the fluid filling material is injected therein, the boundary face of the fluid food materials constituting the preshaped product rises along the cavity walls.

The amount of the fluid filling material to be injected is not particularly limited, as long as the fluid filling material stays within the preshaped product, and the boundary face of the fluid food materials constituting the preshaped product does not rise beyond the cavity capacity after the fluid filling material is injected.

In step (D), when the nozzle is drawn out of the preshaped product, the hole formed by drawing out the nozzle is usually filled in with the fluid food materials constituting the preshaped product. If the fluid food materials have a viscosity too high to completely fill in the hole, the hole may be closed up with a fluid food material similar to those used in step (A) or the like material, before the next step (E) is carried out.

In the method of the present invention, step (D) is followed by step (E) wherein at least the fluid food materials in the cavity are solidified, to thereby obtain a patterned compound food product.

The solidification in step (E) may be carried out by cooling or heating, depending on the kind of the fluid food materials, and the conditions thereof may suitably be selected. Depending on the kind of the fluid filling material injected, the conditions of solidification may be selected so that the fluid filling material is also solidified.

The patterned compound food products obtained by the method of the present invention may be marketed as they are with the mold when the mold is used as a container of the product for sale. Alternatively, the patterned compound food products may be taken out of the cavities using a conventional demolding device before they are marketed.

The production system of the present invention used for the above method has a particular charging device, a particular injecting device, a solidifying device, and a particular translating device, and is characterized in their arrangement and the injecting device.

The outline of the production system of the present invention will now be explained with reference to FIG. 1, but the present invention is not limited thereto.

In FIG. 1, reference numeral 1 refers to an embodiment of the production system of the present invention, 2 is a charging device, 3 is an injecting device, 4 is a solidifying device, and 5 is a translating device.

The charging device 2 charges each of a plurality of cavities of a mold 6 under pressure with predetermined amounts of at least two kinds of fluid food materials of different colors. The device 2 has containers (2a, 2b) for containing each fluid food material, cylinders (not shown) for discharging each fluid food material, and a nozzle assembly shown in FIG. 2 or 5 to be discussed later.

The nozzle assembly may preferably be an assembly including a nozzle mounting substrate and one or more nozzle plates attached to the substrate. Each of the nozzle mounting substrate and the nozzle plates has at least two discrete passages. For implementation on an industrial scale, it is preferred that a plurality of nozzle plates are arranged side by side on the lower surface of the nozzle mounting substrate. As used herein, the "plate" means a plate-like member of as thin as possible, and does not mean a vertically elongate nozzle or a vertically elongate body such as a conventional reservoir for premixing chocolate materials. By shaping each nozzle like a plate, spatial efficiency is improved, and the time required for supplying fluid food materials to a mold can be shortened compared to conventional vertically elongate nozzles, at the same viscosity and supply pressure of fluid food materials supplied to the nozzles, which leads to improvement in production efficiency.

Each passage in the nozzle mounting substrate guides one kind of fluid food material substantially horizontally, and has at least one communication hole in communication with a corresponding one of the passages in a nozzle plate. Thus, a stream of each fluid food material from a passage in the nozzle mounting substrate is supplied to a passage in a nozzle plate located below without merging with a stream of another fluid food material. Each passage in a nozzle plate has at least one discharge hole for discharging one kind of fluid food material into one cavity. At least one of the passages in a nozzle plate is a horizontally guiding passage that guides one kind of fluid food material substantially horizontally. A horizontally guiding passage is designed to have a larger number of discharge holes than that of the communication holes in a passage in the nozzle mounting substrate in communication with that horizontally guiding passage.

As such, fluid food material streams supplied to a passage in the nozzle mounting substrate are increased in number while they pass through a horizontally guiding passage of a nozzle plate disposed below. In other words, a smaller number of supply streams of fluid food materials may be branched easily while the streams are guided horizontally, irrespective of the vertical length of a nozzle, so that a wide variety of patterns may be designed easily by combining in various ways the nozzle mounting substrate with at least one nozzle plate.

Such variety of patterns may be made still wider by arranging a plurality of nozzle plates vertically one on another, and by additionally providing a merging nozzle that merges and discharges fluid food materials of different colors separately discharged from a nozzle plate. This merging nozzle may also be used preferably for gradating the boundaries of merged fluid food materials of different colors in the production method discussed above.

By employing the nozzle assembly above, compound food products produced in cavities can be given substantially the same surface color pattern.

Figure 3:
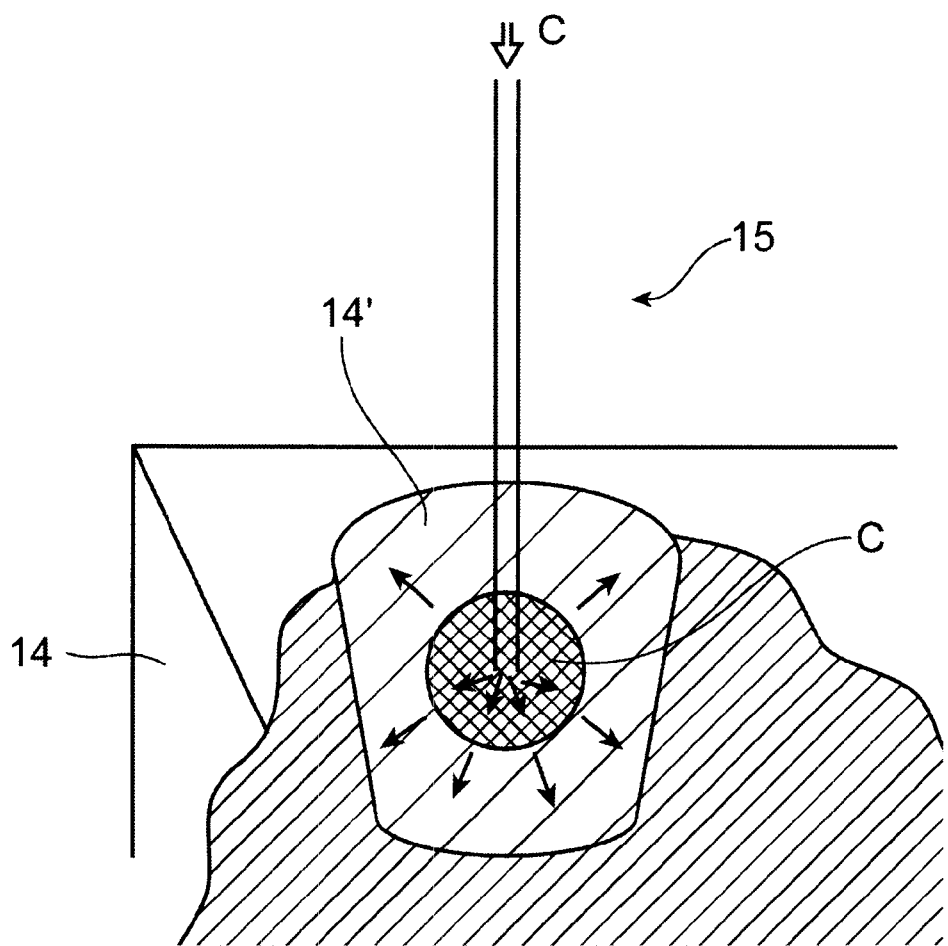
FIG. 3 is an explanatory view for explaining how a fluid filling material is injected using a vertically movable nozzle attached to the injecting device of the production system according to the present invention.

The injecting device 3 injects a predetermined amount of fluid filling material. This device 3 has a container 3a for containing a fluid filling material, a cylinder (not shown) for discharging the fluid filling material, and a vertically movable nozzle as shown in FIG. 3 to be discussed later.

The nozzle of the injecting device 3 injects a fluid filling material into the fluid food materials that have been poured into the cavity in predetermined amounts so that the fluid filling material is enclosed in the fluid food materials. Thus, the diameter of the nozzle should be selected properly. For example, when the fluid food materials are chocolate, a nozzle having the inner diameter of usually 3 to 9 mm, preferably about 6 mm, may be used.

When a hole is formed after the nozzle is drawn out, a device similar to the charging device 2 may be provided after the injecting device 3 and before the solidifying device 4 to fill the hole with a fluid food material for closing up the hole.

The solidifying device 4 solidifies at least the fluid food materials poured into the cavity. The device 4 may be a cooling device such as a cooling tunnel, or a heat chamber.

The translating device 5 is an intermittently moving conveyor, and moves a mold having a plurality of cavities mounted on the conveyor from the charging device 2 to the injecting device 3, and then to the solidifying device 4.

EXAMPLES

A preferred example of the present invention will now be discussed below using chocolate materials as the fluid food materials, but the present invention may be implemented with other food materials. Examples are explained with reference to the drawings, but the present invention is not limited to these.

Example 1

Chocolate compound food products are produced using the production system 1 shown in FIG. 1.

Figure 4:
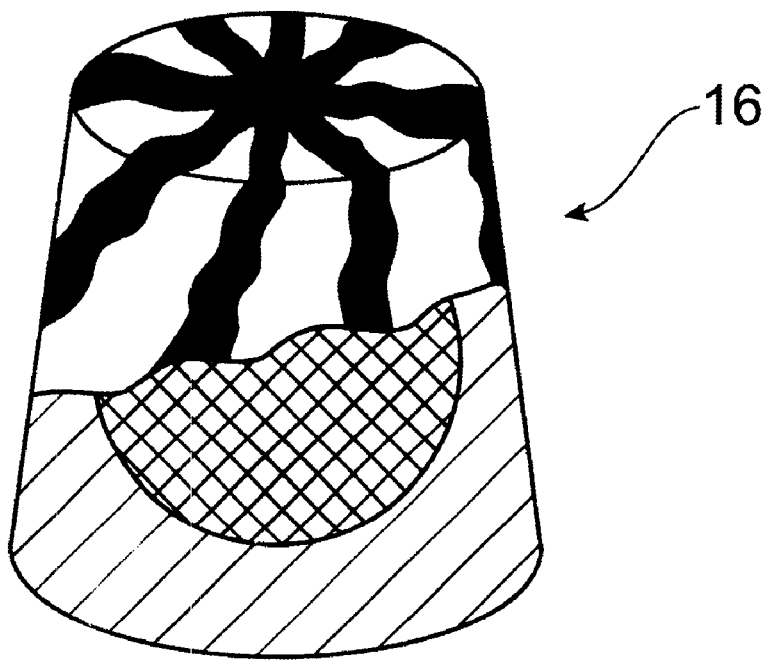
FIG. 4 is a partially fragmentary perspective view of a compound food product manufactured with a production system including the nozzle assembly as shown in FIG. 2 and the vertically movable nozzle as shown in FIG. 3.

As a nozzle assembly disposed adjacent to the containers (2a, 2b) of the charging device 2, a nozzle assembly shown in FIGS. 2(a) to 2(c) is used to pour two kinds of fluid chocolate materials (A, B) of white and brown (chocolate color) simultaneously into a cavity 14' of a mold 14 shown in FIG. 2(d). Through this pouring process, stripes are formed, and a chocolate product 16 having a decorative pattern and appearance as shown in FIG. 4 is obtained.

The nozzle assembly is composed of a nozzle mounting substrate 11 and two nozzle plates (12, 13) attached under the substrate 11 via a connector plate (not shown) with screws.

More specifically, the nozzle mounting substrate 11 has first passages (11a, 11b) for separately and horizontally guiding the fluid chocolate materials (A, B), respectively, supplied from the containers (2a, 2b) shown in FIG. 1, and upper holes (11a', 11b') penetrating the first passages (11a, 11b), respectively. The nozzle plate 12 has concentrically partitioned second passages (12a, 12b) for receiving and horizontally guiding the fluid chocolate materials (A, B) discharged from the upper holes (11a', 11b'), respectively, and lower holes (12a', 12b') penetrating the second passages (12a, 12b), respectively. The nozzle plate 13 has eight lower holes 13a located just below the lower holes 12a' for passing the fluid chocolate material A discharged therefrom, a third passage 13b for receiving and horizontally and radially outwardly spreading the fluid chocolate material B discharged from the lower holes 12b', and eight lower holes 13b' penetrating the outer end portions of the third passage 13b.

Each of the first to third passages (11a, 11b, 12a, 12b, 13b) functions as a compartment for separately and horizontally guiding the fluid chocolate materials (A, B), and the upper (11a', 11b') and lower (12a', 12b', 13a, 13b') holes function to pass the materials downward from the corresponding passages. By alternately arranging these holes (12a', 12b', 13a, 13b'), stripes or a staggered pattern may be formed, or depending on the arrangement of these holes, a white design pattern on a brown background may be formed.

Just below the nozzle plate 13 are located a number of molds having a plurality of frustconical cavities. These molds are intermittently moved by an endless automatic conveyor of the translating device 5 shown in FIG. 1. In FIG. 2(d), A and B indicate sections intended for the fluid chocolate materials (A, B) arranged alternately in the cavity 14' assumed as a decorative chocolate for forming a striped pattern.

Next, a method for producing patterned compound chocolate food products using the above system is explained.

Predetermined amounts of fluid chocolate materials (A, B) are separately supplied from the two containers (2a, 2b) of the charging device 2 shown in FIG. 1 via cylinders to a nozzle assembly shown in FIGS. 2(a) to 2(c). The fluid materials (A, B) first enter the first passages (11a, 11b) in the nozzle mounting substrate 11, and then pass through the upper holes (11a', 11b'), one of which is provided in one of the first passages, downward to the nozzle plate 12. The fluid material A passed through the upper hole 11a' down on to the nozzle plate 12 then spreads horizontally and radially in the outer second passage 12a due to the extruding pressure, and discharged through the eight lower holes 12a' arranged at regular intervals and then through the subjacent, corresponding eight lower holes 13a of the nozzle plate 13 closely disposed under the nozzle plate 12, into the cavity 14'.

On the other hand, the fluid material B passed through the upper hole 11b' down on to the nozzle plate 12 advances horizontally in the inner second passage 12b, and is discharged through the two lower holes 12b' down into the third passage 13b of the nozzle plate 13. The fluid material B moves horizontally in the passage 13b, and is discharged through the eight holes 13b' into the cavity 14'.

Accordingly, eight white fluid material streams and eight brown fluid material streams, in total of sixteen fluid material streams, fall into the cavity 14'. The falling fluid materials are in the form of pastes of similar viscosities, and the same amounts of the materials fall simultaneously into the cavity. Thus, the white and brown fluid materials do not mix with each other, and are received in the cavity in stripes as shown in FIG. 4. In this process, in order to reserve room for the fluid filling material to be injected as discussed later, the amounts of the fluid chocolate materials poured into the cavity should be predetermined to be less than the cavity capacity. The fluid materials poured into the cavity are enclosed by the inner walls of the cavity to form a preshaped product in a substantially fluid state.

Next, a cylindrical nozzle 15 as shown in FIG. 3 installed in the injecting device 3 is inserted into the preshaped product. Through the nozzle 15, a fluid filling material C such as molten chocolate, ganache, or the like is injected, that has a taste different from and a viscosity similar to those of the fluid food materials. By this injection, the boundary face of the preshaped product rises along the side walls of the cavity.

After a predetermined amount of the fluid filling material C is injected, the mold is passed to the solidifying device 4 by the conveyor of the translating device 5 shown in FIG. 1, and the fluid chocolate materials in the cavity are solidified by cooling.

The mold is then turned upside down to face the opening of the cavity 14' downward, and lightly patted to drop the resulting solidified compound food product for collection.

In this way, a patterned compound chocolate food product 16 as shown in FIG. 4 is obtained.

Example 2

A system and a method for producing a patterned compound chocolate food product 16' shown in FIG. 6 will now be explained with reference to FIG. 5.

Figure 2:
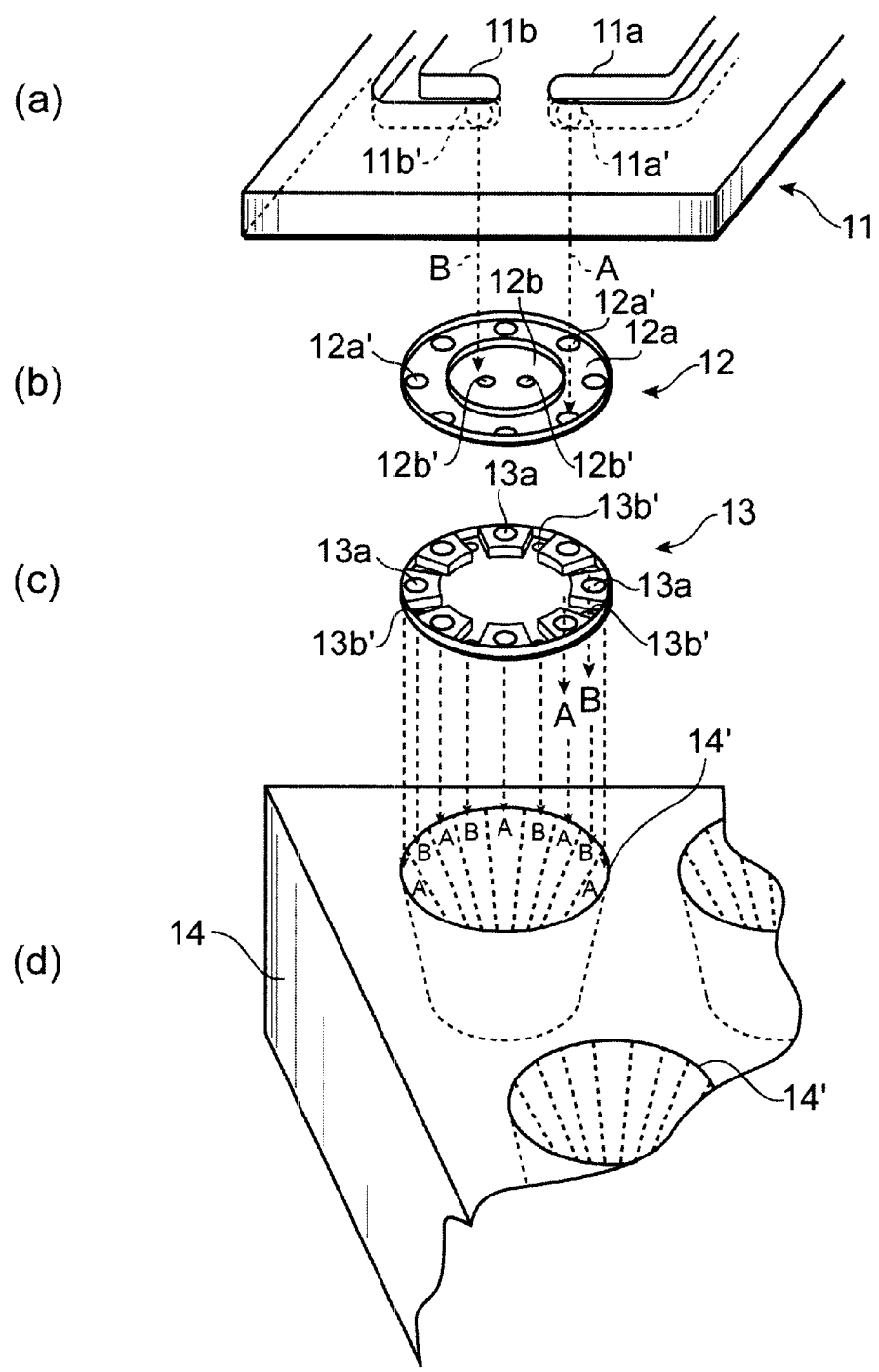
FIGS. 2(a) to 2(c) show an exploded perspective view of an embodiment of a nozzle assembly to be mounted on the charging device of the production system according to the present invention.
FIG. 2(d) is a perspective view showing an embodiment of a mold having a plurality of cavities.
Figure 5:
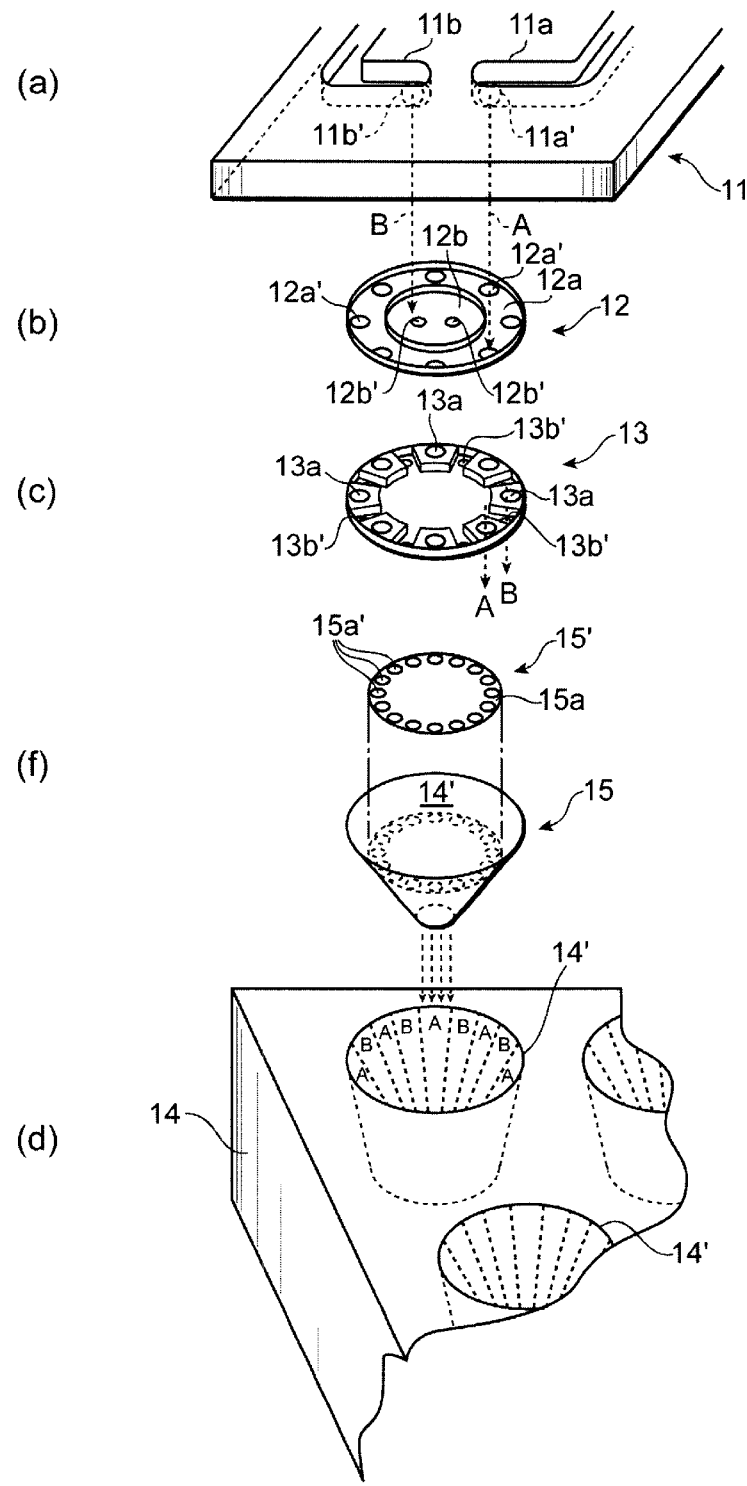
FIGS. 5(a) to 5(c) and 5(f) show an exploded perspective view of another embodiment of a nozzle assembly to be mounted on the charging device of the production system according to the present invention.
FIG. 5(d) is a perspective view showing an embodiment of a mold having a plurality of cavities, similar to FIG. 2(d)

The nozzle assembly ((a) to (f)) as shown in FIG. 5 includes the nozzle assembly ((a) to (c)) shown in FIG. 2 and used in Example 1 and a hopper 15 as shown in FIG. 5(f) added thereto. Thus, the similar members as shown in FIG. 2 will not be explained here.

The hopper 15 is provided with a perforated plate 15' having sixteen discharge holes 15a' arranged along the periphery. The diameter of the discharge holes 15a' is somewhat smaller than that of the lower holes (13a, 13b') shown in FIG. 5(c).

White and brown fluid chocolate materials (A, B) are discharged through the lower holes (13a, 13b') arranged alternately in the same way as in Example 1, and supplied to the corresponding discharge holes 15' in the hopper 15. Most of the supplied fluid materials (A, B) pass through the discharge holes 15a' of the perforated plate 15', but some of the materials do not pass smoothly through the holes 15a' due to the smaller diameter of the holes 15a' than that of the lower holes (13a, 13b'). Such fluid materials (A, B) that do not pass smoothly are mixed on the perforated plate 15', and then pass through the discharge holes 15a' into the cavity 14'.

Figure 6:
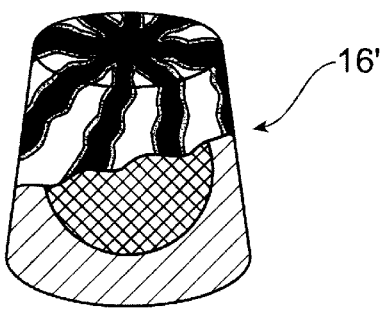
FIG. 6 is a partially fragmentary perspective view of a compound food product having a gradated pattern manufactured with a production system including the nozzle assembly as shown in FIG. 5 and the vertically movable nozzle as shown in FIG. 3.

The processes that follow are the same as in Example 1, and the compound food product shown in FIG. 6 may be obtained.

With the hopper 15 having the perforated plate 15' with discharge holes 15a' being placed just above the cavity 14', gradation may be formed at the boundaries of two different colors in the pattern of the resulting compound chocolate food product as shown in FIG. 6. Such gradation may be varied by changing the arrangement, size, and number of the discharge holes 15a'.

In Examples 1 and 2 above, two kinds of fluid chocolate materials of different colors are used, but three or more kinds of fluid chocolate materials may be used, and compound chocolate food products of a wide variety of patterns may be produced by selecting the arrangement and combination of the holes in the nozzle plates.

As the patterns in the Examples, alternate stripes are illustrated, but patterns may be changed easily also by selecting the arrangement and combination of the holes in the nozzle plates.

Example 3

Figure 7:
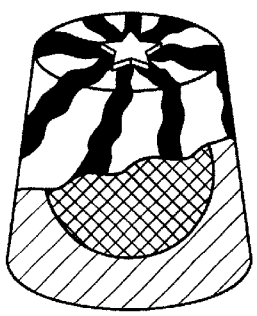
FIG. 7 is a partially fragmentary perspective view of a compound food product of FIG. 4 with a relief incorporated thereon.
Figure 8:
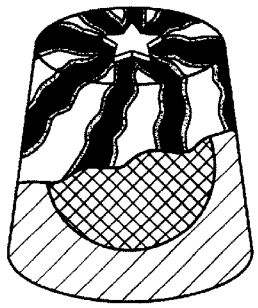
FIG. 8 is a partially fragmentary perspective view of a compound food product of FIG. 6 with a relief incorporated thereon.
Figure 9:
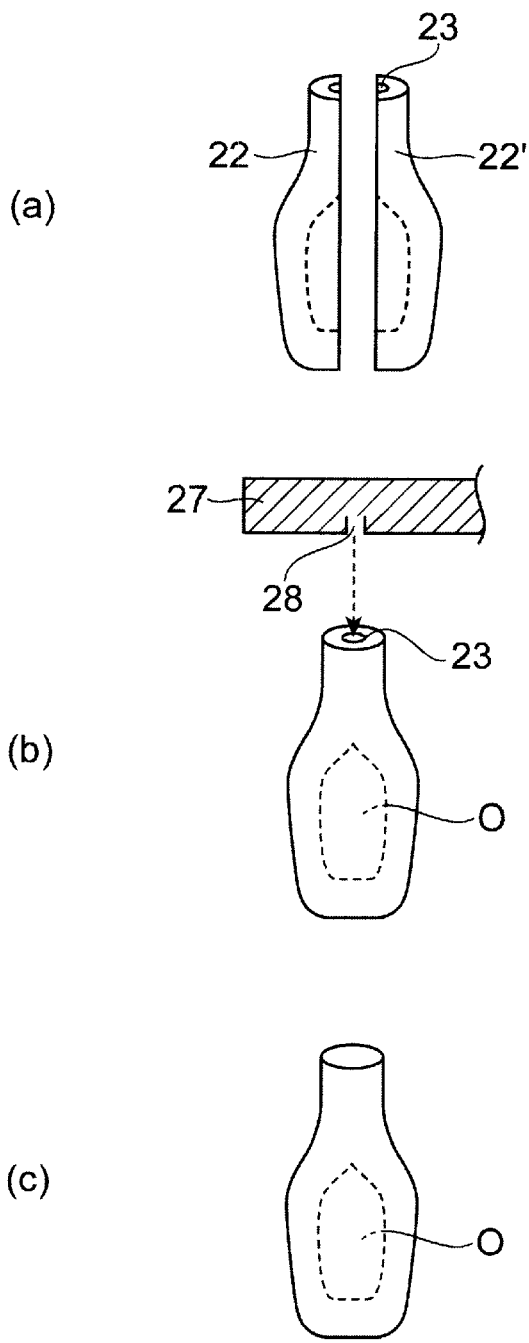
FIGS. 9(a) to 9(c) are explanatory views illustrating a conventional method for producing a compound food product.
Figure 10:
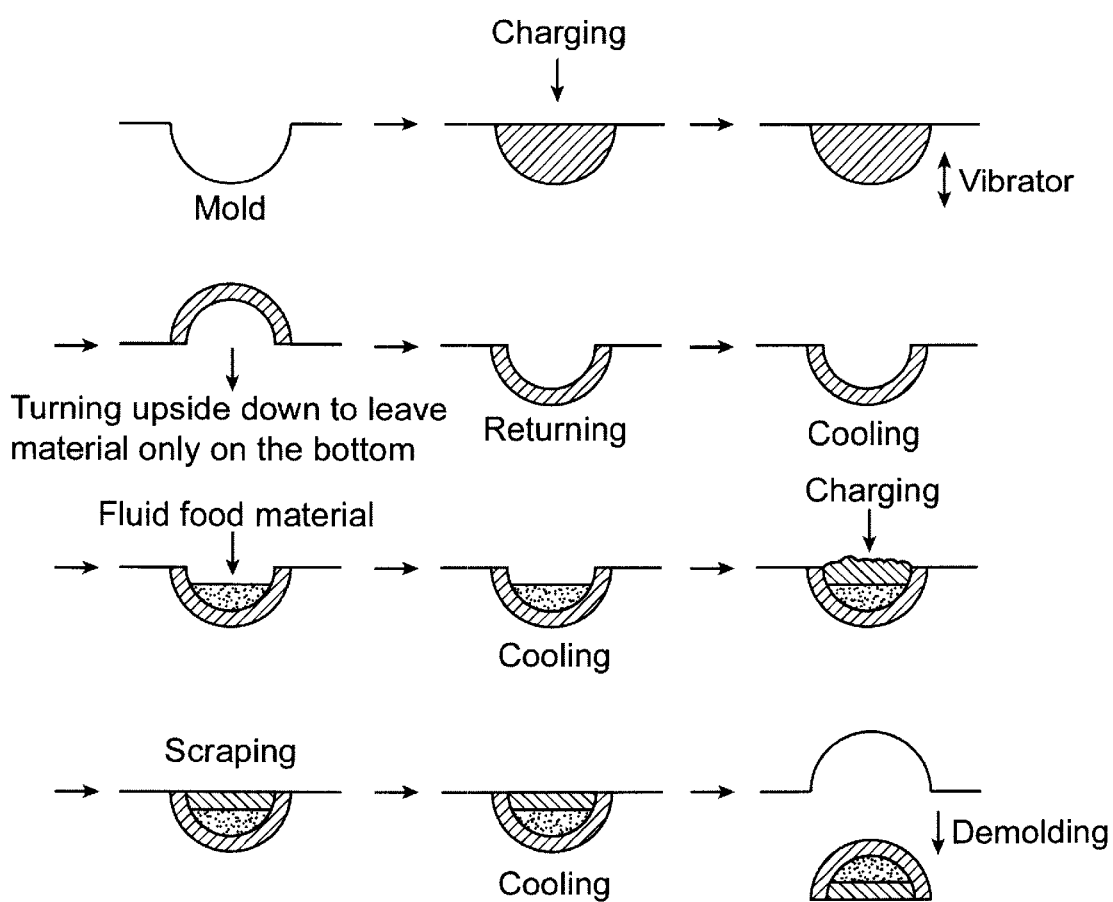
FIG. 10 is an explanatory view illustrating another conventional method for producing a compound food product.

The patterned compound chocolate food products shown in FIGS. 7 and 8 are produced by integrally molding a star-shaped white chocolate with the patterned compound chocolate food products (16, 16') shown in FIGS. 4 and 6, respectively.

Such compound food products may be produced by inserting, before the procedures of Examples 1 and 2, preliminary steps of indenting the bottom of the cavity 14' in a star shape, and pouring a white chocolate material into this dent, and then following the same procedures as in Examples 1 and 2.

What is claimed is:

1. A method for producing patterned compound food products having an outer section with a pattern formed of at least two kinds of fluid food materials of different colors, and an inner section formed of a fluid filling material having a taste different from that of the outer section, said method comprising the steps of:

(A) pouring predetermined amounts of at least two kinds of fluid food materials of different colors for forming an outer section into a cavity of a mold to obtain a preshaped product in a substantially fluid state held in the shape of said cavity;

(B) inserting a nozzle into said preshaped product;

(C) injecting a predetermined amount of fluid filling material for forming an inner section through said nozzle into the preshaped product;

(D) drawing said nozzle out of said preshaped product; and (E) solidifying, after step (D), at least said fluid food materials in the cavity.

2. The method of claim 1 wherein said fluid food materials are molten chocolate.

3. The method of claim 1 wherein said predetermined amounts of at least two kinds of fluid food material of different colors are poured into a cavity of a mold substantially simultaneously and continuously.

4. A production system used for a method of claim 1 for producing patterned compound food products having an outer section with a pattern formed of at least two kinds of fluid food materials of different colors, and an inner section formed of a fluid filling material having a taste different from that of the outer section, said system comprising:

a charging device for pouring predetermined amounts of at least two kinds of fluid food materials of different colors into a cavity of a mold;

an injecting device having a vertically movable nozzle for injecting a predetermined amount of fluid filling material through said nozzle;

a solidifying device for solidifying at least said fluid food materials in the cavity; and a translating device for translating the mold from said charging device to said injecting device and then to said solidifying device.

5. The production system of claim 4, wherein said charging device comprises a nozzle assembly, said nozzle assembly including a nozzle mounting portion having at least two passages for horizontally guiding the fluid food materials, and at least one nozzle plate attached under and in contact with the nozzle mounting portion, each said at least one nozzle plate having at least two discrete passages, wherein each of said at least two passages of the nozzle mounting portion has at least one communication hole in communication with a corresponding one of said at least two discrete passages of said nozzle plate, wherein each of said at least two discrete passages of said nozzle plate horizontally guides one of the fluid food materials, and has at least one discharge hole for discharging the fluid food material, and wherein said nozzle plate has a larger number of discharge holes than that of the communication holes in the nozzle mounting portion.

6. The production system of claim 5, wherein said nozzle assembly includes a plurality of nozzle plates arranged vertically one on another under the nozzle mounting portion.

7. The production system of claim 4 further comprising a charging device, arranged between said injecting device and said solidifying device, for pouring predetermined amounts of at least two kinds of fluid food materials of different colors into the cavity of the mold, wherein said translating device translates the mold from the charging device, to the injection device, then to said charging device, and then to the solidifying device.

* * * * *